(12) United States Patent
Brodock

(10) Patent No.: US 6,276,627 B1
(45) Date of Patent: Aug. 21, 2001

(54) ELECTRIC STRING WINDER

(76) Inventor: Scott L. Brodock, 10446 Runyan Lake Rd., Fenton, MI (US) 48430

( * ) Notice: Subject to any disclaimer, the term of this patent is extended or adjusted under 35 U.S.C. 154(b) by 0 days.

(21) Appl. No.: 09/476,325

(22) Filed: Dec. 30, 1999

Related U.S. Application Data

(60) Provisional application No. 60/118,073, filed on Jan. 29, 1999.

(51) Int. Cl.[7] .................................................. B65H 75/48
(52) U.S. Cl. .................... 242/390.8; 242/394; 242/396.1
(58) Field of Search .............................. 242/390.8, 394, 242/396.1

(56) References Cited

U.S. PATENT DOCUMENTS

| | | | |
|---|---|---|---|
| 2,896,875 | * | 7/1959 | Reed et al. .................. 242/390.8 |
| 3,202,378 | | 8/1965 | Williamson . |
| 3,784,125 | * | 1/1974 | Law et al. .................... 242/390.8 |
| 3,822,839 | * | 7/1974 | Persichini .................... 242/390.8 |
| 3,910,524 | * | 10/1975 | Ireland ........................ 242/390.8 |
| 4,285,477 | | 8/1981 | Oxendahl et al. . |
| 4,962,901 | | 10/1990 | Shirley et al. . |
| 5,190,237 | | 3/1993 | Fagan . |
| 5,277,350 | * | 1/1994 | Thornbury, Jr. ............. 242/390.8 |
| 5,449,308 | * | 9/1995 | Thompson ................... 242/390.8 |
| 5,947,790 | * | 9/1999 | Gordon ........................ 242/390.8 |

* cited by examiner

Primary Examiner—Emmanuel M. Marcelo
(74) Attorney, Agent, or Firm—Richard C. Litman

(57) ABSTRACT

A compact electric string winder that can be safely and conveniently deployed by masons and other construction workers. The string winder comprises a battery-driven electric motor inside a housing that fits in the palm of a hand and that attaches to a coaxial reel. The reel, or spool, has a receiving bore which receives and clamps upon by friction a rotating shaft pin extending from the motor. A wire spin guard prevents rotation of the reel when it is not in use. A switch lock, which locks the motor in its off position, is provided on a single track that intersects the on/off switch track at a right angle. The string winder is a compact device enabling easy and rapid deployment and retrieval of construction string, thereby enhancing worker efficiency, health and safety.

10 Claims, 5 Drawing Sheets

ELECTRIC STRING WINDER

CROSS-REFERENCE TO RELATED APPLICATION

This application claims the benefit of U.S. Provisional Patent Application Ser. No. 60/118,073, filed Jan. 29, 1999.

BACKGROUND OF THE INVENTION

1. Field of the Invention

The invention relates to construction line reels and, more particularly, to a construction line reel having a small electric motor to facilitate convenient and rapid deployment and reeling of line by construction workers.

2. Description of Related Art

Construction workers, including carpenters, masonry workers, steel workers, and roofers are frequently required to use long lengths of heavy string, referred to hereinafter as construction line, pulled taut between various points in order to establish straight lines, necessary in order to properly align various structural members or elements during construction, both at ground level and at high, dangerous portions of partially completed structures. Construction workers frequently need to dispense construction line in and about construction traffic, and under other adverse circumstances and according to often burdensome construction deadlines, and sudden changes in weather conditions. For example, a worker who must walk or convey himself along a high, narrow beam, or along the top of a partially completed wall section while dispensing construction line may experience considerable difficulty focusing his attention both on keeping his balance and simultaneously dispensing, or winding up the string line. Similarly, intermittent moving of construction equipment and traffic, phase completions, and rain or sleet require rapid deployment and retrieval of construction lines. Moreover, inadvertently discarded, or muddied strings often cause workers to trip and occasionally fall. These conditions, taken together, give rise to the need for a motorized string reel that is compact, easy to store on a construction belt, and fast to operate. The motor and drive shaft should easily fit in the palm of the hand. The motor, drive shaft, and reel, assembled, should easily fit into an ordinary trouser or coat pocket.

At a cost of approximately 4 to 6 dollars for one roll of mason's string, there is a cost and an inconvenience associated with the string getting lost, destroyed, run over, etc., often because it takes too long to roll the string up onto a storage spindle. Moreover, the typical construction spindle on the market today requires the holding of a handle while turning a spool, which takes much time and effort, and causes the wrist and forearm to fatigue.

The common mason's string today is frequently wound on an elongated piece of board or a spool. Several patents are known to be relevant to such devices, including U.S. Pat. No. 4,285,477 issued to Oxendahl et al., which describes a construction line reel in the form of a wing-shaped spool. U.S. Pat. Nos. 650,925, 542,564, 4,285,477, and 109,318 also disclose cord bearing heads rotatably mounted on spindle-like handles.

U.S. Pat. Nos. 3,202,378, 4,962,901, and 5,190,237 disclose motor-driven fishing and kite reels utilizing a retrofitted flashlight, and screwdriver, respectively. However, the disclosed devices are not uniquely suited to solving those problems associated with construction industry uses relating to convenience, and versatility. For example, none of the disclosed motorized devices among the related art has the simple friction fit between reel and motor. Moreover, the prior art does not fit easily into the pocket of a construction worker due to various spool housings, multiple parts, protrusions and extending edges of the related art devices.

The main problem with the prior art is that those devices were designed for fishing and flying kites, both of which require a spool that is capable of handling significant tension within the string and were therefore designed to withstand significant torsion forces between the spool and the drive shaft. Construction string lines, on the other hand, need not withstand significant torsion between the spool and the handle since the only tension on the string arises from the friction between the string and the ground, together with any internal friction in the reel. The difficulty with construction string, however, is that the winding process is tedious, and even painful to those having arthritis or carpel tunnel syndrome. What has been needed in the construction industry is an electric string winder, or reel, which has nothing more than a friction fit between the drive shaft and the spool, can be easily pulled apart and snapped together, and that effortlessly winds large spools of string. The prior art fishing reel spool housings are designed to be used with very thin line, and typically do not accommodate thick rolls of heavy construction string. Finally, none of the above motorized spools have the combination of switch, switch lock, and latch features.

None of the above inventions and patents, taken either singly or in combination, is seen to describe the instant invention as claimed.

SUMMARY OF THE INVENTION

The present invention is a lightweight, inexpensive, easy to use and store, highly efficient motorized construction line reel that can be safely and conveniently deployed for purposes of construction work. The cord-bearing reel is elongated in the direction of its axis of rotation. Symmetrical, opposing notches are disposed along the two major sides of the reel. Projecting from the perimeter of each of the two major sides is a perimeter parapet wall. Thus, a cross section of the reel taken at any plane normal to the axis of rotation (except at the two opposite ends) has an I-beam shape.

The reel is provided with a starting hole through the major surfaces to accommodate the cord, and a notch through the free-end of the reel to receive and to terminate the end of the wound cord when it is not in use. The opposite head, closest to the motor, has a circular flange having a centrally disposed, raised receiving bore, to receive a drive shaft extending from the motor housing.

The motor housing is ergonomically shaped to fit in the palm of an average human hand. The motor housing has two opposing primary surfaces, three preferably curved sides, and a preferably flat front side abutting the reel. The motor housing is elongated along the same axis as the reel. The motor housing and reel are connected, end to end, by a drive shaft pin having the diameter of a needle pump, and protruding approximately ¼" from the flat end of the motor housing. The drive shaft is inserted into, and maintains a friction fit within, a hard plastic receiving bore at the end of the reel. A wire-like spin guard that halts movement of the reel is attached to and rotates about two sockets, one through each primary surface of the motor housing. The spin guard envelope s and captures a corner of the reel so as to prevent its rotation when the device is not in use.

On a primary surface of the motor housing, near its flat end, is a sliding on/off switch, disposed on a sliding double track oriented along the longitudinal axis. A switch lock, which locks the motor in its off position, is also provided. The switch lock is on a single track that intersects one track of the on/off switch, at a right angle. The switch lock slides into a gap in the surface housing that is created when the on/off switch slide is in its off position.

It is an object of the invention to provide a construction line dispensing apparatus which can be conveniently and easily retrieved, allowing the worker to use the invention and promptly move from one phase of construction to the next.

Still another object of the invention is to provide a safely and conveniently deployable construction line reel which helps contractors avoid the inconvenience of having to purchase new string when the deployed string of the prior art becomes tangled, damaged, or destroyed.

It is another object of the invention to provide a construction line reel that enables safe, efficient and rapid retrieval of construction line.

It is a further object of the invention to provide a construction line reel that is light weight, compact and streamlined, such that it can fit in a vest or trouser pocket.

Still another object of the invention is to provide a construction line reel that is easily assembled and disassembled simply by pulling the motor and reel apart, and by snapping it back together such that there is a simple friction fit between reel and motor drive shaft.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention may be generally characterized as an electric string winder 11 that includes a reel 10 connected to a coaxial housing containing an electric motor with shaft pin that causes string on a reel to wind and unwind. It can be used in all phases of construction where it is necessary to run a string, i.e. surveying, forming, laying fence posts, framing, laying foundations, block walls, and masonry, etc.

Figure 1:
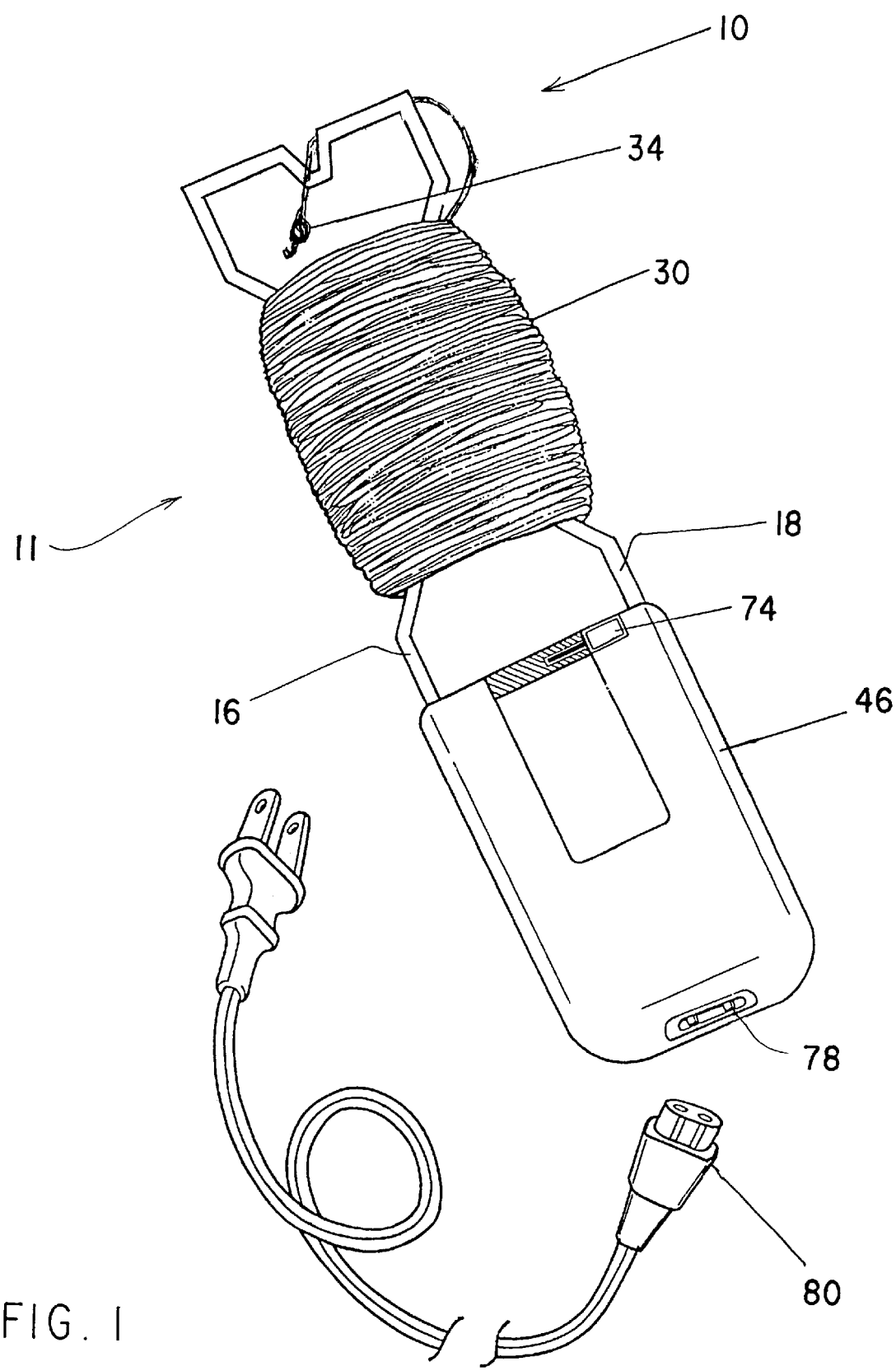
FIG. 1 is an environmental, perspective view of a electric string winder including cord, plug, motor, and reel, according to the present invention.
Figure 4:
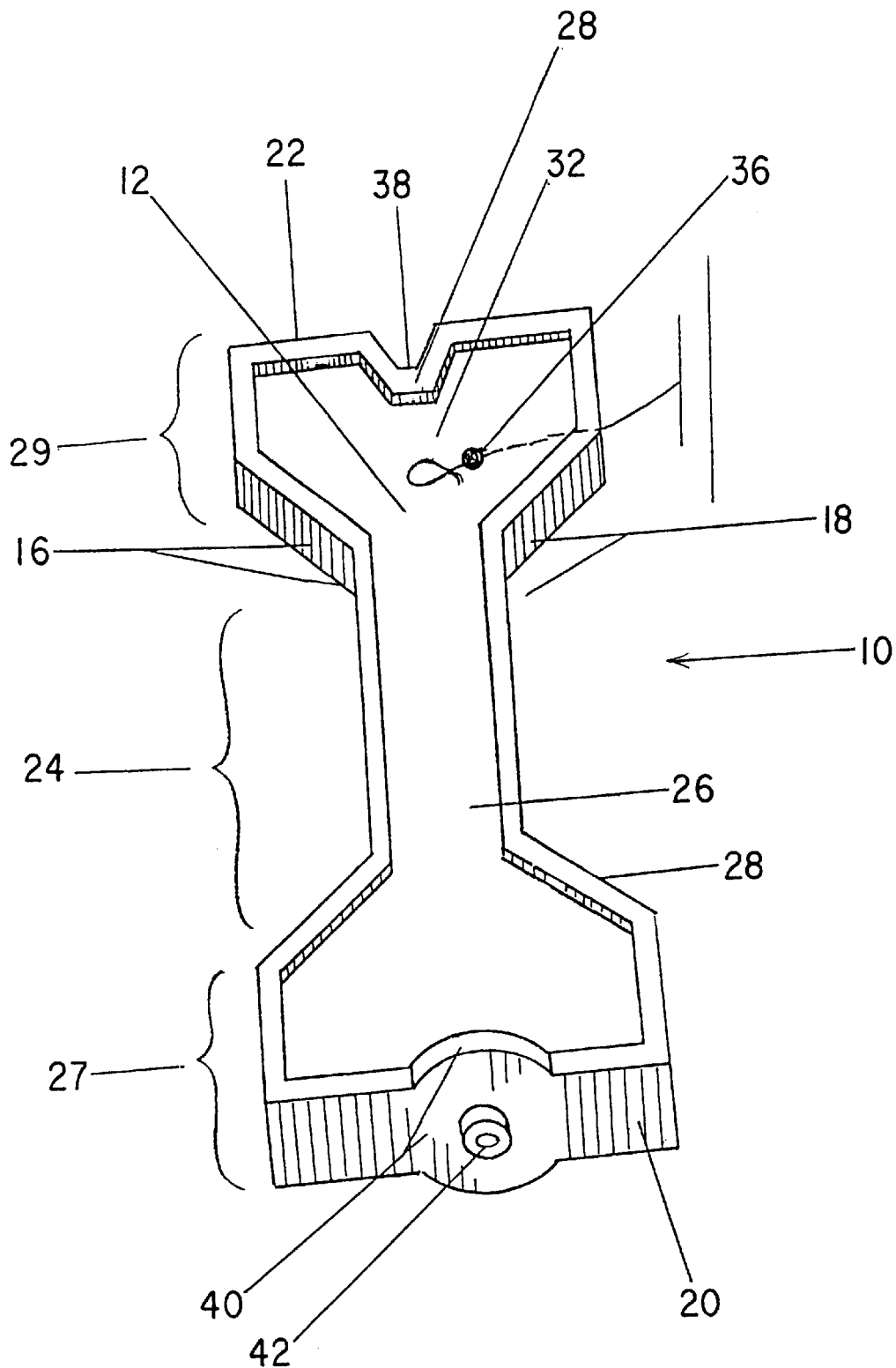
FIG. 4 is a perspective view of the reel showing the drive shaft receiving socket at lower edge of reel.

The reel 10 of electric string winder 11 is shown in FIG. 1 and FIG. 4. FIG. 4, the preferred reel embodiment, shows a rotating plastic reel 10 having the shape of a flattened spool and elongated in the direction of its axis of rotation. Reel 10 has two major surfaces denoted as surface 12 and surface 14.

Reel 10 also has a left side 16 and a right side 18 connecting the two major surfaces, a near end 20, and far end 22 opposite near end 20. Reel 10 has symmetrically opposing wide notches 24 carved centrally along each of the left side 16 and right side 18. The notches 24 define a hub 26 connecting near head 27 to far head 29. The two major surfaces may also have a parapet wall 28 around their perimeters.

FIG. 1 and FIG. 4 reveal a cord 30, wound about hub 26 and abutting near head 27 and far head 29. Cord 30 may be string, twine, yarn, nylon or any other suitable material. Cord 30 has a first end 32 and a second end 34 whereby first end 32 is initially strung through a hole 36 made between surface 12 and surface 14. After cord 30 is wound about hub 26, second end 34 is terminated in slot 38, which is notched out of far end 22.

FIG. 4 shows a circular flange 40 centered on near end 20 of reel 10. Centrally disposed within flange 40 is a hard plastic circular receiving bore 42, protruding slightly above near end 20, and having a hole sized to snugly receive drive shaft pin 44. Pin 44 is preferably stainless steel, but may be made with other metals, alloys, or composites.

Figure 3:
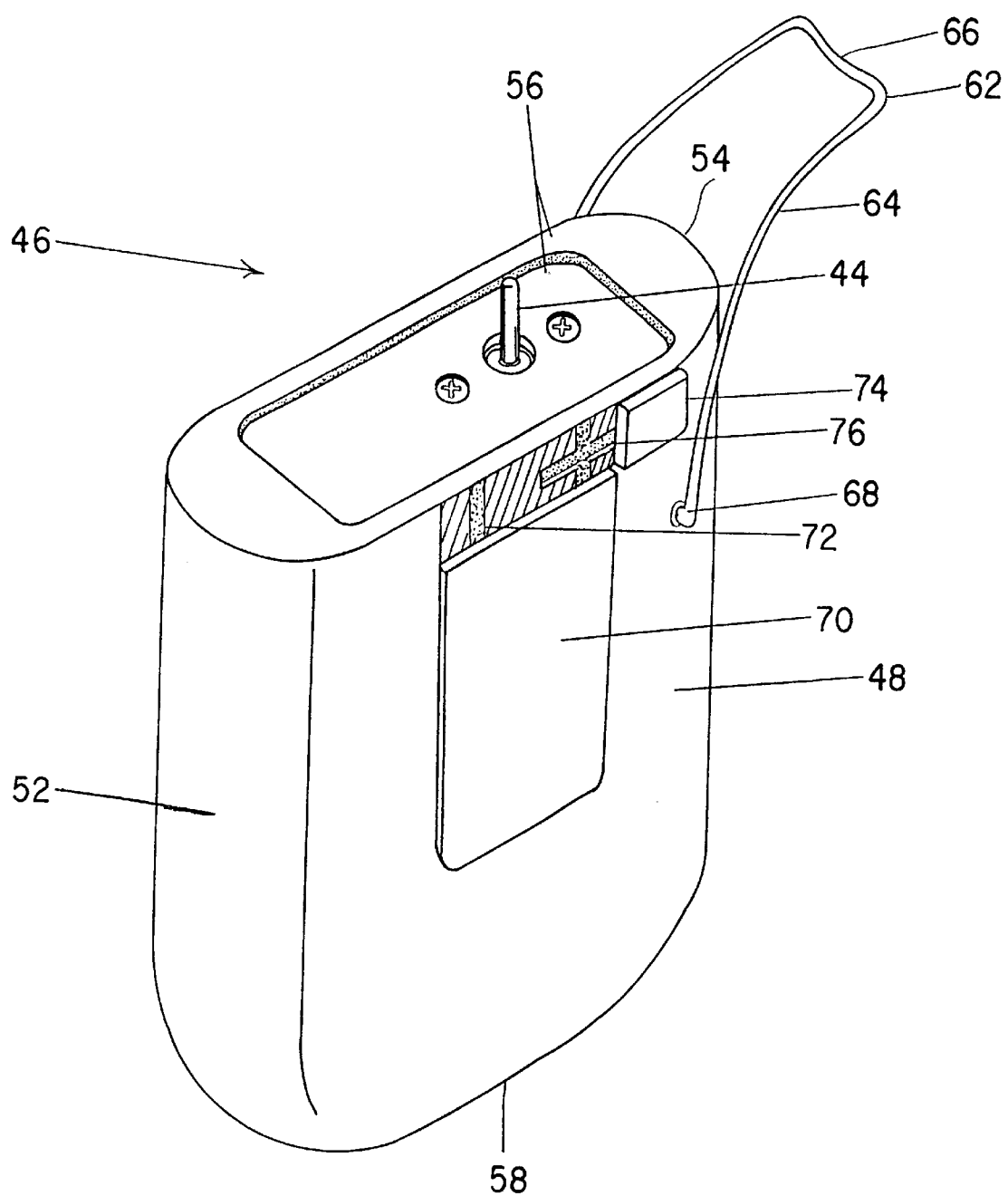
FIG. 3 is a perspective view of the motor housing and drive shaft projecting from the top of the housing, on/off switch, switch lock, and spin guard.

Referring to FIG. 3, drive shaft pin 44 links reel 10 to a free-spinning (i.e., negligible drag) electric motor 45 encased in motor housing 46. Motor 45 preferably has the voltage of a small, hand-held electric razor, such as that manufactured under the trade name REMINGTON. The voltage under which motor 45 operates may range from 1 to 18 volts, and is preferably about 3 to 8 volts. Motor 45 is battery-powered. Batteries are stored in housing 46, and are connected to motor 45 through wires in a well-known manner. The batteries are preferably rechargeable inside housing 46. Housing 46 is generally constructed of plastic and is in the general shape of a flat rectangular bar that ergonomically fits in the palm of an average human hand. Reel 10 together with housing 46 is approximately the size of an average hand such that the assembly as a whole conveniently fits in a typical breast pocket of a jean jacket. Housing 46 has a longitudinal axis that is collinear with the longitudinal axis of reel 10. Housing 46 has two major surfaces, including upper surface 48, parallel to lower surface 50. Housing 46 has four sides, each connecting upper surface 48 to lower surface 50. Among those four sides is port side 52, and latch side 54. Sides 52 and 54 are preferably rounded in shape. The remaining two sides include front side 56 opposite back side 58. Sides 56 and 58 are preferably flat and parallel with one another. Motor 45 serves to rotate shaft pin 44 about its longitudinal axis. When motor 45 is off, and cord 30 is being deployed, shaft pin 44 is freely rotating to the extent that the electric motor operates substantially without drag. Pin 44 protrudes approximately ¼" beyond front side 56 of housing 46. Shaft pin 44 is slidably received, and preferably maintains nothing more than frictional engagement, within bore 42 of reel 10. The primary reason that a simple friction fit is possible is because there is virtually no resistance in cord 30 other than what is created by the weight of cord 30. What this means is that reel 10 and housing 46 can be snapped together just as quickly and as easily as they can be pulled apart. The device is not only particularly easy to assemble, but is also easy to disassemble when, for example, the cord becomes tangled.

Figure 2:
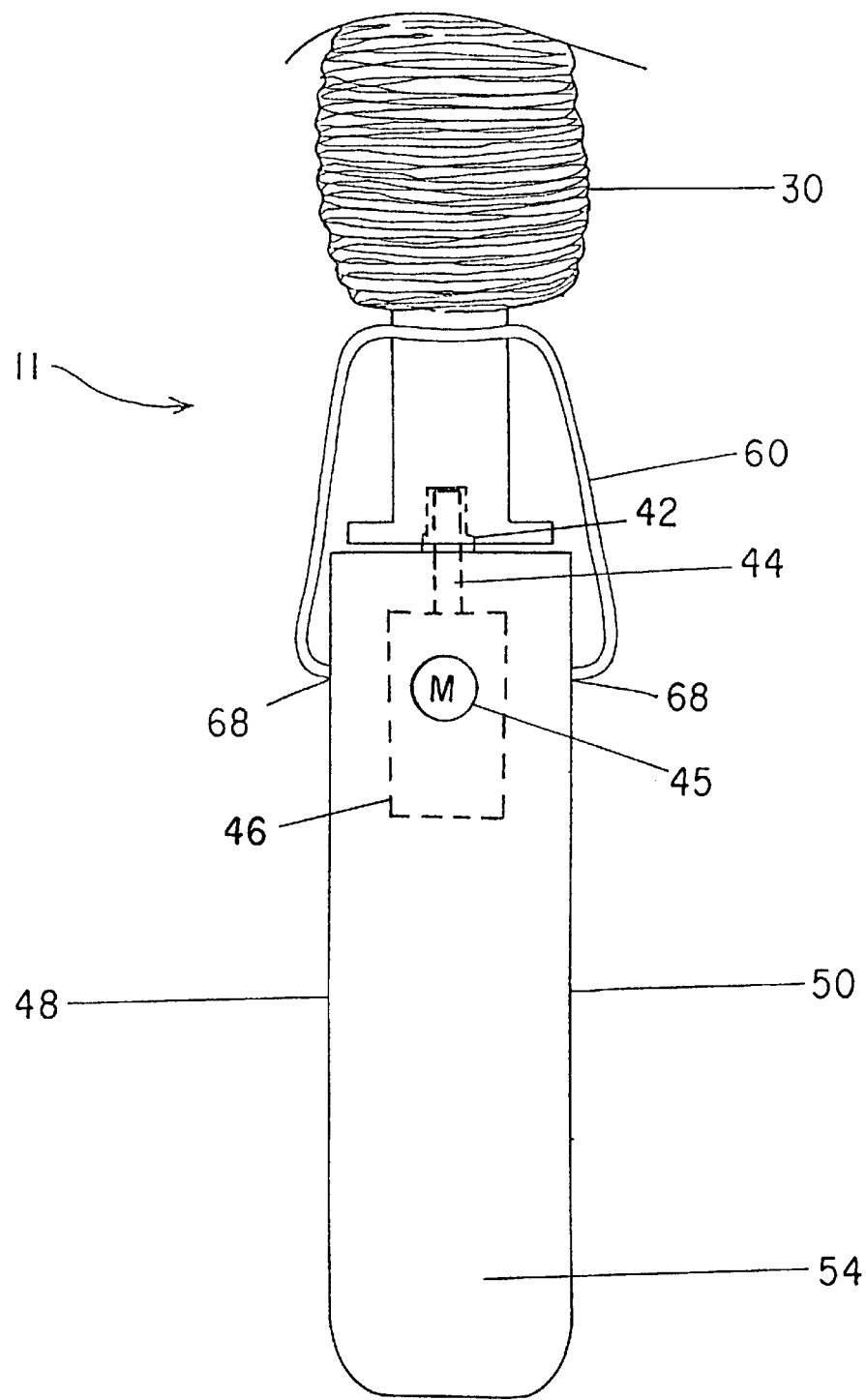
FIG. 2 is a side view of reel, motor, motor housing, and spin guard.

Referring to FIG. 2 and FIG. 3, metal spin guard 60, preferably made from wire, is attached by two spin guard sockets 68, one in upper surface 48 and one in lower surface 50 of housing 46. Guard 60 has two symmetrical lengths on either side of its longitudinal center point 66. Guard 60 has an approximately 90 degree first bend 62, proximate center point 66, and an approximately 120 degree second bend 64 occurring between first bend 62 and one of the sockets 68. Guard 60 is rotatable along latch side 54, and rotatable about an axis through sockets 68, normal to the longitudinal axis of housing 46 of reel 10. Guard 60 has two resting positions. The first resting position is also referred to as the "up position" (see FIG. 2). In the up position, guard 60 halts rotation, in either direction, of reel 10, by surrounding and capturing right side 18 of near head 27 of reel 10. In its second resting position, guard 60 is inoperable, and is resting alongside, near the midpoint of, latch side 54 of housing 46.

Figure 5A:
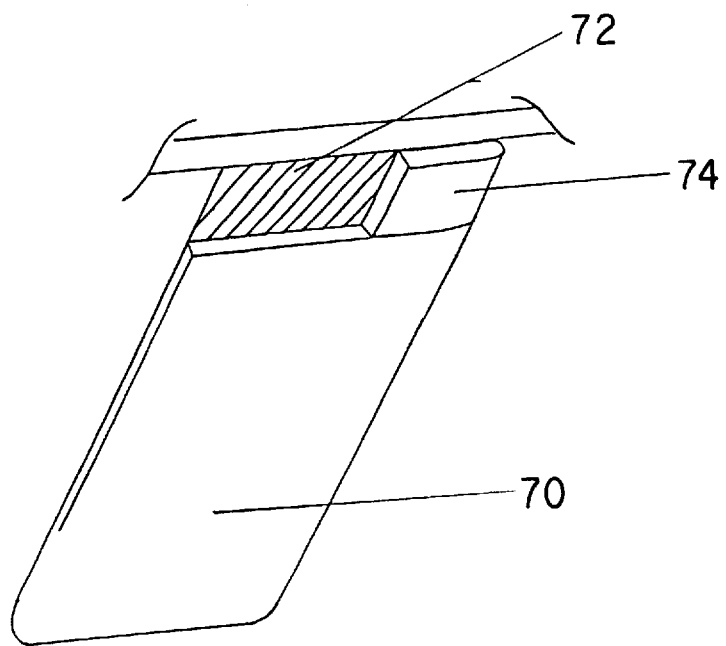
FIGS. 5A and 5B show the on/off switch in the off/locked, and, in the on/unlocked positions, respectively.
Figure 5B:
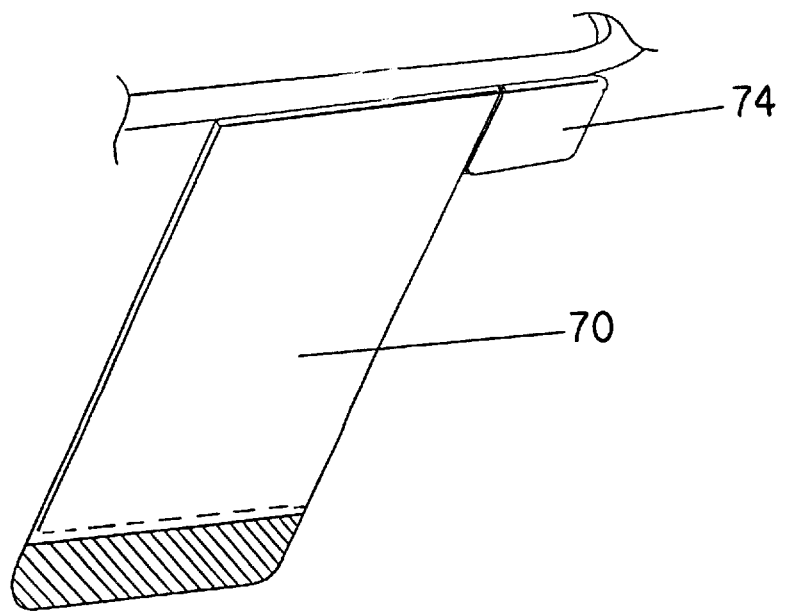

Referring to FIG. 3, FIG. 5A, and FIG. 5B, an on/off switch 70 is disposed on switch track 72. Switch 70 is attached to, and slidable longitudinally upon, upper surface 48 of housing 46. FIG. 5A shows switch 70 in the off position, and FIG. 5B shows switch 70 in the on position. A switch lock 74 is slidably disposed on switch lock track 76, wherein lock track 76 is normal to track 72, and capable of locking switch 70 in the off position.

Referring back to FIG. 1, there is a charging port 78 on back side 58 of housing 46 for receiving plug 80, and for recharging batteries in housing 46.

It is to be understood that the present invention is not limited to the sole embodiments described above, but encompasses any and all embodiments within the scope of the following claims.

I claim:

1. An electric string winder, comprising:
    a rotating reel elongated in the direction of its axis of rotation, said reel further comprising:
        a left side and a right side connecting two opposing major surfaces;
        a near end and a far end connecting said major surfaces;
        symmetrically opposing notches disposed along said left side and said right side;
        a hub connecting a near head to a far head;
        a cord having a first end and a second end, said cord wound around said hub and abutting said heads;
        a starting hole extending through said major surfaces, through which said first end of said cord is received;
        a notch through said far end of said reel, through which said second end of said cord is received;
        a circular flange disposed on said near head of said reel;
        a raised receiving bore projecting through a center of said flange;
    a motor housing shaped like a flat rectangular bar that fits in the palm of an average human hand, said housing having a longitudinal axis that is coaxial to the longitudinal axis of said reel, said housing further comprising:
        an upper surface parallel to a lower surface;
        a port side connecting said upper surface to said lower surface;
        a latch side connecting said upper surface to said lower surface;
        a substantially flat front side connecting said upper surface to said lower surface;
        a back side connecting said upper surface to said lower surface;
        a rechargeable, battery-driven motor disposed within said housing;
    a rotating shaft pin connected to said motor, said shaft pin protruding from said front side, said pin frictionally held in place by, and easily hand slidably removable from, said receiving bore of said reel;
    a wire-type spin guard hingedly attached to a socket in said upper surface and said lower surface of said housing, said spin guard rotatable along said latch side of said housing, and rotatable about an axis normal to said longitudinal axis of said housing, said guard capable of stopping rotation of said reel by capturing said near head of said reel;
    an on/off switch disposed on a sliding switch track formed on said upper surface of said housing;
    a switch lock capable of locking said switch in an off position, said switch lock disposed on a second track that is normal to said switch track; and
    a charging port on said back side of said housing for receiving a plug and for recharging batteries.

2. An electric string winder, comprising:
    a cord having a first end and a second end;
        an elongated, approximately palm-sized reel, including:
        a hub, a near head, and a far head, said hub connecting said near head to said far head;
            a starting hole extending through said reel and capable of capturing said first end of said cord;
            a notch through which said second end of said cord is retained; and
            a receiving bore through said near head;
        an elongated motor housing coaxial with said reel, said housing capable of fitting within a palm of an average human hand;
        a spin guard rotatably attached to said motor housing, said guard capable of halting the rotation of said reel by capturing said near head of said reel;
        a battery-powered electric motor having an operating voltage of about 3 to 8 volts disposed within said motor housing;
        a rotating motor-driven shaft pin connected to said motor and protruding from said motor housing, said shaft pin receivable and tightly fitting within said receiving bore; and
        an on/off switch disposed in a switch track on a surface of said motor housing.

3. The device according to claim 2, further comprising a switch lock capable of locking said switch in an off position.

4. The device according to claim 3, wherein said switch lock is on a second track that is normal to said switch track.

5. The device according to claim 4, further comprising a charging port on said back side of said housing for receiving a plug, and for recharging of batteries.

6. The device according to claim 2, further comprising a charging port on a back side of said housing for receiving a plug and for recharging of batteries.

7. An electric string winder, comprising:
    a cord having a first end and a second end;
        an elongated, approximately palm-sized reel, including:
        a hub, a near head, and a far head, said hub connecting said near head to said far head;
            a starting hole extending through said reel and capable of capturing said first end of said cord;
            a notch through which said second end of said cord is retained; and
            a receiving bore through said near head;
        an elongated motor housing coaxial with said reel, said housing having a charging port on a back side for receiving a plug and for recharging of batteries, said housing capable of fitting within a palm of an average human hand;

a battery-powered electric motor having an operating voltage of about 3 to 8 volts disposed within said motor housing;

a rotating motor-driven shaft pin connected to said motor and protruding from said motor housing, said shaft pin receivable and tightly fitting within said receiving bore; and an on/off switch disposed in a switch track on a surface of said motor housing.

8. The device according to claim 5, further comprising a spin guard rotatably attached to said motor housing, said guard capable of halting the rotation of said reel by capturing said near head of said reel.

9. The device according to claim 7, further comprising a switch lock capable of locking said switch in an off position.

10. The device according to claim 9, wherein said switch lock is on a second track that is normal to said switch track.

* * * * *